3,005,809
VINYL ALCOHOL-CROTONIC ACID COPOLYMERS
Arthur I. Lowell, Plainfield, and Alio J. Buselli, New Providence, N.J., and William H. Taylor, Cleveland, Ohio, assignors to Air Reduction Company, Incorporated, New York, N.Y., a corporation of New York
No Drawing. Filed Sept. 5, 1957, Ser. No. 682,258
4 Claims. (Cl. 260—85.7)

This invention relates to new self-sustaining, water soluble sheets or films of vinyl alcohol-crotonic acid copolymers and salts thereof. The invention includes an improved alcoholysis reaction for preparing vinyl alcohol-crotonic acid copolymers and the salts thereof from the corresponding vinyl acetate-crotonic acid copolymers. The invention further includes, as new articles of manufacture, substances designed to be used with water enclosed by or wrapped in vinyl alcohol-crotonic acid and acid salt copolymer films.

A very convenient method of packaging substances designed to be used in water such as soaps, synthetic detergents, bleaches, economic poisons, and the like is to enclose or wrap them in a water soluble film or wrapper. When such substances are packaged in this manner the entire package can be deposited in the water, the wrapper dissolved, and the substance brought in direct contact with the water. It is thus an object of this invention to provide improved, self-sustaining, water soluble films useful as wrappers for substances designed to be used in water. It is a further object of this invention to provide improved packages containing substances designed to be used in water.

The self-sustaining, water soluble films of this invention are vinyl alcohol-crotonic acid or acid salt copolymers containing between 2 and 20 mol percent crotonic acid. It has been found, however, that vinyl alcohol-crotonic acid copolymers are particularly advantageous when the crotonic acid content of the copolymer is maintained between 4 and 10 mol percent. The resulting films have significantly improved cold water solubility and form improved heat seals.

The self-sustaining, water soluble films of this invention are readily soluble in cold water within a few seconds in the absence of agitation. The films can be heat sealed by conventional methods and equipment. The formed heat seal is strong, is not subject to delamination, and readily dissolves in cold water. The complete and rapid dissolution of the heat seal in cold water is particularly important where the package is designed to be deposited in spraying devices and the like where the presence of insoluble matter would result in the clogging of the spray nozzle. The vinyl alcohol-crotonic acid salt copolymer films of this invention can also be advantageously used to package neutral chlorine liberating compounds or bleaches without being subject to undesirable insolubilization of the film wrapper by the liberated chlorine. Neutral chlorine liberating compounds can be packaged in the vinyl alcohol-crotonic acid salt copolymer films of this invention and stored for long periods of time without significantly affecting the water solubility of the films. Stored or aged packages thus wrapped can be deposited in water after being stored and the film and heat seal rapidly dissolved. The vinyl alcohol-crotonic acid and acid salt copolymer films of this invention are also clear and colorless.

The vinyl alcohol-crotonic acid copolymers of this invention can be formed from the corresponding vinyl acetate-crotonic acid copolymers by various methods well-known in the art such as hydrolysis, alcoholysis, and saponification.

The starting vinyl acetate-crotonic acid copolymers are known and can be prepared in various known manners. For example, vinyl acetate-crotonic acid copolymers can be prepared by the bead or suspension polymerization technique by depositing the desired mol percent of crotonic acid and vinyl acetate in a suitable reaction vessel together with a suitable polymerization catalyst such as benzoyl peroxide, a small amount of a partially acetylated polyvinyl alcohol of medium viscosity, such as that marketed by the Colton Chemical Co. under the trade name Vinol PA-40, and a volume of water about equal to the volume of the monomers. The reaction mixture can then be heated at a slow reflux until the reaction is complete. The reaction mixture can then be cooled and the vinyl acetate-crotonic acid beads filtered off.

The novel method of preparing the vinyl alcohol-crotonic acid and acid salt copolymers which can be used to form the self-sustaining, water soluble films of this invention involves the alcoholysis of the corresponding vinyl acetate-crotonic acid copolymer in the presence of a base. The amount of base present must be at least sufficient to substantially neutralize all of the free carboxylic groups of the copolymer with excess base to catalyze the alcoholysis of the acetyl groups of the copolymer. Procedurewise, the alcoholysis reaction can be carried out by dissolving the vinyl acetate-crotonic acid copolymer in a sufficient amount of a suitable lower alkanol and adding thereto the appropriate amount of base. The reaction proceeds at ambient temperature and will generally be complete within about 3 hours. The resulting reaction mixture contains the salt of the vinyl alcohol-crotonic acid copolymer. The alcoholysis reaction can be carried out in a dilute alkanol solution but is more advantageously carried out in a minimum excess of an alkanol by a kneader process. When the copolymers are prepared by a kneader process, the reaction mixture can be used directly to form the salt copolymer films of this invention but the reaction mixture can be neutralized to a pH of about 7 to remove the catalyst. The reaction mixture can be neutralized by various methods such as by the addition of a sufficient amount of acid, e.g. acetic acid, to bring the pH of the reaction mixture to about 7.

The vinyl alcohol-crotonic acid copolymer can be recovered in the acid form by neutralization of the catalytic base and acidification of the crotonic acid moieties. For example, the addition of a sufficient amount of an acid such as acetic acid to the reaction mixture to bring the reaction mixture to a pH of between about 4–5, or the addition of an amount of acid to the reaction mixture which is substantially the mol equivalent of the base originally used in the alcoholysis reaction will result in the formation of the vinyl alcohol-crotonic acid copolymer.

Various basic or alkaline materials soluble in the lower alkanols can be used to form the vinyl alcohol-crotonic acid and acid salt copolymers and to catalyze the alcoholysis reaction according to this invention including sodium and potassium hydroxide, sodium and potassium methylate, as well as other basic materials useful for catalyzing alcoholysis reactions.

The amount of base required in the alcoholysis of the vinyl acetate-crotonic acid copolymers according to this invention can be varied over a fairly wide range depending upon the mol percent of crotonic acid in the copolymer, the type of basic material employed, and so forth. Since substantially all of the carboxylic acid groups of the crotonic acid moieties present in the vinyl acetate-crotonic acid copolymer would react with the base to form the corresponding salt, it is necessary to use an amount of basic material in excess of the stoichiometric equivalent of the carboxylic acid groups present. The amount of excess basic material would be that which would be sufficient to catalyze the alcoholysis reaction.

The exact amount of base to be used to form the salt copolymers and to catalyze the alcoholysis reaction according to this invention can be determined by routine experimentation by those skilled in the art. The vinyl acetate-crotonic acid copolymers can be dissolved in an excess of a lower alkanol such as methanol, the reaction mixture stirred, and the base gradually added until a sufficient amount is present to promote or start the reaction. Once the reaction has started, addition of the base can be stopped and the reaction allowed to proceed at ambient temperature until complete. The stoichiometric amount of base and the catalytic excess can also be calculated via the acid number of the vinyl acetate-crotonic acid copolymer.

Various lower alkanols can be used to react with the vinyl acetate-crotonic acid copolymers such as methanol and ethanol. The alkanols and amounts thereof generally used in alcoholysis reactions of polyvinyl acetate can similarly be used in the alcoholysis reaction of this invention.

It is preferable to carry out the alcoholysis reaction at ambient temperatures, but higher or lower temperatures can be used if desired. The time of reaction will depend mainly upon the temperatures and the amount and type of catalyst used to promote the reaction and the extent of alcoholysis of the acetyl groups of the polymer. In forming the polyvinyl alcohol-crotonic acid copolymer films of this invention we have found that it is advantageous to use a vinyl alcohol-crotonic acid copolymer in which at least about 90 percent of the acetyl groups are converted to hydroxyl groups.

The continuous, self-sustaining, water soluble films of this invention can be formed by conventional and well-known casting processes. For example, the copolymer can be formed into a 30 percent aqueous solution and flowed onto a casting surface such as a metal wheel or belt. The aqueous solvent can then be removed to form a substantially dry, self-supporting film, and the film stripped from the casting surface.

Various plasticizers can be used with the vinyl alcohol-crotonic acid and acid salt copolymers of this invention to improve the flexibility of the films. It has been found that the various plasticizers which can be used to plasticize polyvinyl alcohol films can similarly be used to plasticize the vinyl alcohol-crotonic acid copolymers of this invention. A low molecular weight polyethylene glycol, such as those marketed under the trade names Glycol E200 by Dow Chemical Company and Polyglycol 200 by Olin Mathieson Chemical Corporation, has been found to be a particularly advantageous plasticizer. Polyethylene glycol plasticizers can be used within the range of about 5–25 percent by weight based on the weight of the vinyl alcohol-crotonic acid copolymer and it has been found that about 20 percent by weight is most advantageous.

The invention includes mechanical mixtures of alkaline materials and vinyl alcohol-crotonic acid copolymers. As discussed above, it has been found that the vinyl alcohol-crotonic acid salt copolymer films are particularly advantageous for packaging neutral chlorine liberating compounds and bleaches. It has been further found that the vinyl alcohol-crotonic acid polymer can be blended with a dry soluble base and the salt copolymer can be formed during the preparation of the casting solution which involves placing the dry mixture in water and heating it to place the copolymer in solution.

Various substances can be enclosed by or wrapped in the films of this invention including soaps, synthetic detergents, bath oils, bleaches, economic poisons, and the like. The substances designed to be used in water can be water soluble or water insoluble. Some examples of neutral chlorine liberating compounds which can be advantageously packaged in the vinyl alcohol-crotonic acid salt copolymer films of this invention include dichlorodimethyl hydantoin, dichloro isocyanuric acid, trichloro isocyanuric acid, and the like.

*Example I*

A solution of sodium hydroxide was prepared by dissolving 2 grams of sodium hydroxide in 400 milliliters of methanol. The solution was placed in a suitable reaction vessel equipped with a stirrer and 40 grams of a vinyl acetate-crotonic acid copolymer in bead form containing about 4 mol percent crotonic acid and 96 mol percent vinyl acetate dissolved in 400 milliliters of methanol were slowly added to the sodium hydroxide solution with stirring over a 3-hour period at ambient temperature. The stirring was continued and the reaction continued under these conditions until over 90 percent of the acetyl groups had been converted to hydroxyl groups. The reaction mixture was a cloudy solution. 3 grams of acetic acid were then added to bring the reaction mixture to a pH of 5. The polyvinyl alcohol-crotonic acid copolymer precipated as a finely divided precipitate upon addition of the acetic acid. The copolymer was then separated from the reaction mixture by filtration and the filter cake washed three times by slurrying it with methanol and air dried. The polyvinyl alcohol-crotonic acid copolymer contained 4 mol percent crotonic acid.

10 percent by weight of polyethylene glycol marketed by Olin Mathieson Chemical Corporation under the trade name Polyglycol 200 was dry blended with the vinyl alcohol-crotonic acid copolymer in a suitable mill. The blending of the polyethylene glycol plasticizer did not result in any apparent changes in the appearance of the copolymer. The vinyl alcohol-crotonic acid copolymer was then dissolved in water to form a 30 percent solution.

A continuous film of the solution was then formed by conventional casting procedure by flowing a 7 mil wet film of the solution on a glass surface. The wet film was heated to 250° F. for 4 minutes resulting in the removal of the solvent and in the formation of a 1½ mil dry film which was stripped from the casting surface.

A measured quantity of a synthetic detergent was then wrapped with a portion of the film and the film heat sealed by conventional technique. A strong true heat seal was readily formed. The package thus prepared was then deposited in a quantity of cold water. The polyvinyl alcohol-crotonic acid film disintegrated within 10 seconds in the absence of agitation bringing the synthetic detergent into direct contract with the water. The vinyl alcohol-crotonic acid film including the heat sealed portion thereof completely dissolved within 27 seconds.

*Example II*

A portion of the vinyl alcohol-crotonic acid copolymer formed in Example I was dry blended with 5 mol percent sodium hydroxide together with 15 percent by weight of a polyethylene glycol plasticizer. The film was cast by conventional techniques to a thickness of 1½ mils. Packages were formed containing measured portions of a commercial, neutral, chlorine liberating bleach containing dichlorodimethyl hydantoin and the packages closed by heat sealing the edges of the film by conventional techniques. Accelerated aging of the packages was then accomplished by storing for 21 days at 93 percent relative humidity and ambient temperature. The accelerated aging of 21 days was equivalent to a storage of about 6 months under ordinary conditions. The packages were then deposited in water (38° C.) with moderate agitation and the films disintegrated within 60 seconds and completely dissolved within 200 seconds. The heat sealed portion of the package was also completely dissolved in water within 200 seconds.

*Example III*

A polyvinyl alcohol-crotonic acid salt copolymer was formed in the same manner as set forth in Example I with the exception that 0.36 gram of acetic acid was added to the reaction mixture to bring the reaction mixture to a pH of about 7. Upon the addition of the lesser amount of acetic acid a finely divided precipitate of the vinyl alcohol-crotonic acid sodium salt copolymer substantially free of base was formed and was subsequently separated from the reaction mixture by filtration. The filter cake was washed three times by slurrying it with methanol and allowed to air dry.

15 percent by weight of a polyethylene glycol plasticizer was then dry blended with the vinyl alcohol-crotonic acid salt copolymer in a suitable mill and a film formed therefrom by conventional procedures in the same manner described in Example I. Packages were then formed with the formed films containing a neutral chlorine liberating bleach and aged in the same manner as described in Example II. When deposited in water the films disintegrated within about 60 seconds and completely dissolved within about 200 seconds.

We claim:

1. The method of forming vinyl alcohol-crotonic acid copolymers which comprises reacting a vinyl acetate-crotonic acid copolymer with an excess of a lower alkanol in the presence of a base selected from the group consisting of sodium hydroxide, potassium hydroxide, sodium methylate and potassium methylate, the amount of such base being at least sufficient to substantially completely neutralize the free carboxyl groups and to catalyze the alcoholysis of the acetyl groups of the copolymer.

2. The method of claim 1 in which the vinyl acetate-crotonic acid copolymer contains from 4 to 10 mol percent crotonic acid.

3. The method of claim 2 in which the resulting reaction mixture is acidified to a pH of about 7.

4. The method of claim 2 in which the resulting reaction mixture is acidified to a pH of about 5.

References Cited in the file of this patent

UNITED STATES PATENTS

| | | |
|---|---|---|
| 1,344,664 | Wander | June 29, 1920 |
| 2,403,004 | Kenyon et al. | July 2, 1946 |
| 2,527,495 | Fitzhugh | Oct. 24, 1950 |
| 2,539,395 | Banks | Jan. 30, 1951 |
| 2,618,384 | Hatfield | Nov. 18, 1952 |
| 2,692,256 | Bauer et al. | Oct. 19, 1954 |
| 2,715,590 | Brockman et al. | Aug. 16, 1955 |

FOREIGN PATENTS

| | | |
|---|---|---|
| 201,397 | Australia | Apr. 4, 1956 |
| 874,214 | Germany | Apr. 20, 1953 |